United States Patent
Zhang et al.

(10) Patent No.: US 11,577,215 B2
(45) Date of Patent: Feb. 14, 2023

(54) METHOD FOR PRODUCING ABSORBENT

(71) Applicant: Guangzhou University, Guangzhou (CN)

(72) Inventors: Gaosheng Zhang, Guangzhou (CN); Ye Liu, Guangzhou (CN); Huosheng Li, Guangzhou (CN); Xiangping Li, Guangzhou (CN); Yongheng Chen, Guangzhou (CN)

(73) Assignee: GUANGZHOU UNIVERSITY, Guangzhou (CN)

( * ) Notice: Subject to any disclaimer, the term of this patent is extended or adjusted under 35 U.S.C. 154(b) by 0 days.

(21) Appl. No.: 17/472,619

(22) Filed: Sep. 11, 2021

(65) Prior Publication Data
US 2022/0126265 A1   Apr. 28, 2022

(30) Foreign Application Priority Data
Oct. 26, 2020   (CN) .......................... 202011155740.4

(51) Int. Cl.
| | | |
|---|---|---|
| *B01J 20/02* | (2006.01) | |
| *B01J 20/30* | (2006.01) | |
| *C02F 1/28* | (2023.01) | |
| *C02F 101/20* | (2006.01) | |
| *C02F 103/10* | (2006.01) | |

(52) U.S. Cl.
CPC ....... *B01J 20/0292* (2013.01); *B01J 20/0211* (2013.01); *B01J 20/3071* (2013.01); *C02F 1/281* (2013.01); *C02F 2101/20* (2013.01); *C02F 2103/10* (2013.01)

(58) Field of Classification Search
CPC .... B01J 20/02; B01J 20/0292; B01J 20/0211; B01J 20/3071; C02F 1/281; C02F 2101/20; C02F 2103/10
USPC ........................................................ 502/400
See application file for complete search history.

(56) References Cited

U.S. PATENT DOCUMENTS

| | | | | |
|---|---|---|---|---|
| 3,723,596 | A | * | 3/1973 | Lecuit .................... B01J 20/043 423/430 |
| 2003/0134735 | A1 | * | 7/2003 | Xue ...................... B01J 20/0277 264/44 |
| 2012/0223022 | A1 | * | 9/2012 | Hassler .............. B01J 20/28057 210/717 |

* cited by examiner

*Primary Examiner* — Edward M Johnson
(74) *Attorney, Agent, or Firm* — Getech Law LLC; Jun Ye

(57) ABSTRACT

An adsorbent for wastewater treatment includes titanium hexametaphosphate; the titanium hexametaphosphate is mainly prepared from hexametaphosphate and titanium salt. The adsorbent is an aggregate of micron or nanometer particles, with a large surface area and a good adsorption performance. The adsorbent, as a wastewater treatment agent, may effectively remove thallium contaminants in various water bodies such as underground water, surface water, chemical wastewater and mine wastewater at a removal rate of 99.8%; and the adsorbent has a good removal capability for heavy metals in water such as cadmium, plumbum, copper, stibium, cesium and uranium. The adsorbent has a wide applicable PH value range, and especially has a good adsorption capacity, stability and heat resistance under acidic conditions.

5 Claims, 2 Drawing Sheets

METHOD FOR PRODUCING ABSORBENT

TECHNICAL FIELD

The disclosure relates to a field of wastewater treatment technologies, and particularly to an adsorbent and its preparation method and application.

BACKGROUND

Adsorption method is one of the most efficient methods for removing thallium contaminants in underground water, surface water and industrial wastewater. The method is characterized by simple operation, low cost, low sludge production, low secondary pollution risk, etc., which is generally applicable to a water treatment system with a large treatment capacity and a low contaminant concentration. In the method, a solid material is configured as an adsorbent to transfer thallium contaminants from a water phase to an adsorbent surface through physical adsorption, chemical adsorption, ion exchange, etc., thereby achieving the purpose of removing thallium in water.

There are many adsorbent materials for removing thallium, including natural minerals, industrial and agricultural wastes and synthetic adsorbent materials. Low-cost adsorbents are zeolite, montmorillonite, kaolin and cellulose; synthetic adsorbent materials are activated carbon, titanium dioxide, titanium peroxide, manganese dioxide, hydrated ferric oxide, fe-mn composite oxide, magnetic ferroferric oxide, aluminum oxide, etc. Most existing thallium removal adsorbent materials have a better removal effectiveness for thallium at a pH above 7, however, the removal effectiveness is poor and the material stability is poor at a low pH. In real situations, the pH of most thallium-containing wastewater is very low (for example, a mine wastewater pH=2.7), which limits the actual application of the adsorbent material.

Therefore, it is urgent to provide an adsorbent capable of effectively treating acidic thallium-containing wastewater.

SUMMARY

The present disclosure is intended to solve at least one of technical problems existing in the related art. For this purpose, the disclosure provides an adsorbent that may effectively treat acidic thallium-containing wastewater, with a simple preparation method and low cost.

An adsorbent includes titanium hexametaphosphate; the titanium hexametaphosphate is mainly prepared from hexametaphosphate and titanium salt.

Preferably, the titanium hexametaphosphate is mainly prepared from hexametaphosphate and titanium salt under acidic conditions.

Preferably, the particle size of the titanium hexametaphosphate is 10 nm to 10 μm.

A method for preparing an adsorbent includes:

Adding acid into a hexametaphosphate solution for adjusting a pH to prepare a mixed solution, adding titanium salt into the mixed solution, reacting, aging and filtering to obtain a filter residue, namely the adsorbent.

Preferably, the pH is 0-6; further preferably, the pH is 0-3.

Preferably, a ratio of amount of substance of the hexametaphosphate to the titanium salt is (1-2):(3-1).

Preferably, the hexametaphosphate is selected from at least one of sodium hexametaphosphate, potassium hexametaphosphate or ammonium hexametaphosphate.

Preferably, the titanium salt is selected from at least one of titanium tetrachloride, titanium oxychloride, titanium nitrate or titanium sulfate.

Preferably, the concentrated acid is selected from at least one of concentrated hydrochloric acid, concentrated nitric acid and concentrated sulfuric acid.

Preferably, the reaction temperature is 25° C.-180° C.; preferably, the reaction temperature is 85° C.-160° C.; more preferably, the reaction temperature is 90° C.-150° C.

Preferably, the aging time is 1-24 h; preferably, the aging time is 8-24 h.

Preferably, the preparation method further includes purification of a filter residue.

Preferably, the purification method includes water washing and drying.

Preferably, the drying process includes: drying at 40° C.-60° C. for 1-12 h, and then drying at 90-120° C. for 6-24 h; further preferably, drying at 40° C.-55° C. for 1-12 h, and then drying at 100-110° C. for 6-24 h.

A wastewater treatment agent includes the adsorbent.

The application of the adsorbent in wastewater treatment.

Compared with the related art, the disclosure has the following beneficial effects:

(1) The adsorbent is an aggregate of micron or nanometer particles, with a large surface area and a good adsorption performance. The adsorbent, as a wastewater treatment agent, may effectively remove thallium contaminants in various water bodies such as underground water, surface water, industrial wastewater and mine wastewater at a removal rate of 99.8%; and the adsorbent has a good removal capability for heavy metals in water such as cadmium, plumbum, copper, stibium, cesium, uranium.

(2) The adsorbent has a wide applicable pH value range, and especially has a good adsorption capacity, stability and heat resistance under acidic conditions.

(3) The preparation method is simple to operate, low in reaction condition requirements and low in cost.

DETAILED DESCRIPTION

To make those skilled in the art understand the technical scheme more clearly, the following embodiments are listed for illustration. It should be noted that the following embodiments are not intended to be a limitation of the protection scope of the claims.

The titanium dioxide adsorbent, the manganese dioxide adsorbent, the hydrated ferric oxide adsorbent and the aluminum oxide adsorbent in the following contrast embodiments are purchased from Beijing Top Science Biological Technology Co., Ltd.; the raw materials, reagents or apparatuses used in the following embodiments may be purchased from a conventional commercial approach, or may be obtained by a known method.

Embodiment 1: Preparation of an Adsorbent

Figure 1:
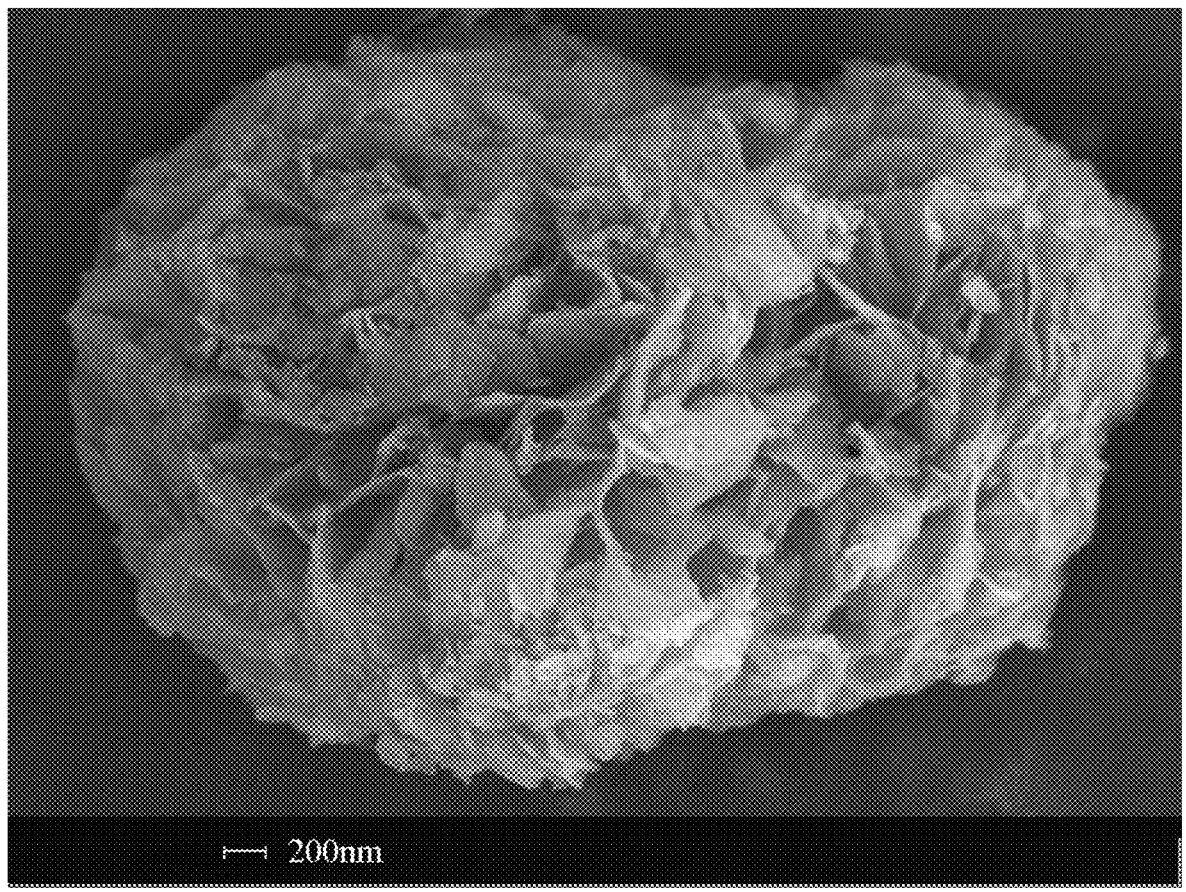
FIG. 1 is a scanning electron microscope (SEM) diagram of an adsorbent prepared in Embodiment 1.
Figure 2:
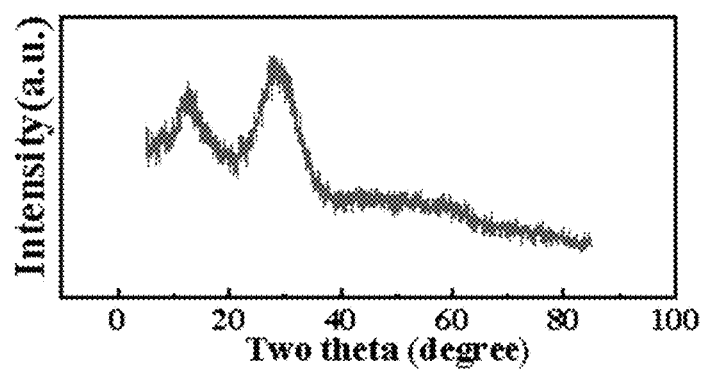
FIG. 2 is an X-ray diffraction (XRD) diagram of an adsorbent prepared in Embodiment 1.

Weigh 0.2 mol $(NaPO_3)_6$ and dissolve in 200 mL water to prepare a solution; add concentrated nitric acid to adjust the pH of the solution to 1; rapidly stir the solution at a room temperature, add 0.3 mol $Ti(SO_4)_2$, continue stirring for 1 h, and stand still at a room temperature to age for 24 h. Pour out above water, then add 1000 mL deionized water, stir and wash for 10 min, perform solid-liquid separation by a suction filtration method, continue washing a solid filter cake for 4 times with deionized water, dry the solid filter cake in an oven at 50° C. for 2 h after separating the adsorbent, heat up to 100° C. and dry for 12 h to obtain a titanium hexametaphosphate adsorbent-1. FIG. 1 is an SEM diagram of an adsorbent prepared in Embodiment 1, and it can be seen that titanium hexametaphosphate adsorbent-1 nanoparticles are formed by agglomeration of lamellar structures and in a pleated pattern. FIG. 2 is an X-ray diffraction (XRD) diagram of a titanium hexametaphosphate adsorbent-1, and it can be obviously seen that two peaks appear at 12 degrees and 29 degrees respectively.

Embodiment 2: Preparation of an Adsorbent

Figure 3:
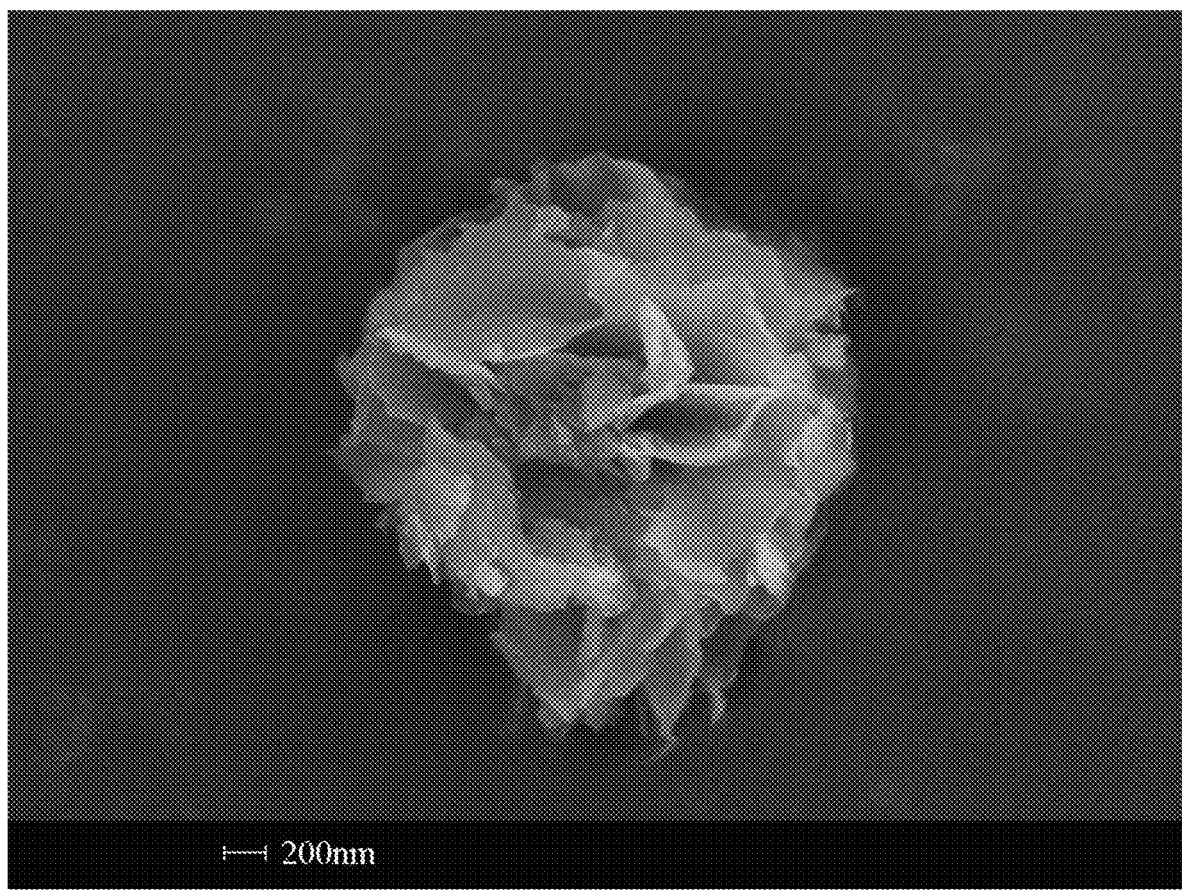
FIG. 3 is a scanning electron microscope (SEM) diagram of an adsorbent prepared in Embodiment 2.

Weigh 0.2 mol $(NaPO_3)_6$ and dissolve in 200 mL water to prepare a solution; add concentrated nitric acid to adjust the pH of the solution to 2; rapidly stir the solution at a room temperature and add 0.4 mol $Ti(SO_4)_2$. Then pour a mixture into a reactor and continue a hydrothermal reaction in an oven at 100° C. for 6 h. Take out and stand still at a room temperature to age for 12 h after completion. Pour out above water, then add 1000 mL deionized water, stir and wash for 10 min, perform solid-liquid separation by a suction filtration method, continue washing a solid filter cake for 3 times with deionized water, dry the solid filter cake in an oven at 55° C. for 8 h after separating the adsorbent, heat up to 100° C. and dry for 8 h to obtain a titanium hexametaphosphate adsorbent-2. The SEM diagram sees FIG. 3.

Embodiment 3: Preparation of an Adsorbent

Weigh 0.2 mol $(NaPO_3)_6$ and dissolve in 200 mL water to prepare a solution; add concentrated nitric acid to adjust the pH of the solution to 0; rapidly stir the solution at a room temperature and add 0.5 mol $Ti(SO_4)_2$. Then pour a mixture into a reactor and continue a hydrothermal reaction in an oven at 150° C. for 6 h. Take out and stand still at a room temperature to age for 8 h after completion. Pour out above water, then add 1000 mL deionized water, stir and wash for 10 min, perform solid-liquid separation by a suction filtration method, continue washing a solid filter cake for 4 times with deionized water, dry the solid filter cake in an oven at 40° C. for 12 h after separating the adsorbent, heat up to 100° C. and dry for 6 h to obtain a titanium hexametaphosphate adsorbent-3.

Embodiment 4: Preparation of an Adsorbent

Weigh 0.2 mol $(NaPO_3)_6$ and dissolve in 200 mL water to prepare a solution; add concentrated nitric acid to adjust the pH of the solution to 1; rapidly stir the solution at a room temperature and add 0.6 mol $Ti(SO_4)_2$. Then pour a mixture into a reactor and continue a hydrothermal reaction in an oven at 85° C. for 8 h. Take out and stand still at a room temperature to age for 6 h after completion. Pour out above water, then add 1000 mL deionized water, stir and wash for 10 min, perform solid-liquid separation by a suction filtration method, continue washing a solid filter cake for 3 times with deionized water, dry the solid filter cake in an oven at 43° C. for 9 h after separating the adsorbent, heat up to 100° C. and dry for 20 h to obtain a titanium hexametaphosphate adsorbent.

Embodiment 5: Preparation of an Adsorbent

Weigh 0.4 mol $(NaPO_3)_6$ and dissolve in 200 mL water to prepare a solution; add concentrated nitric acid to adjust the pH of the solution to 1; rapidly stir the solution at a room temperature and add 0.2 mol $Ti(SO_4)_2$. Then pour a mixture into a reactor and continue a hydrothermal reaction in an oven at 180° C. for 8 h. Take out and stand still at a room temperature to age for 6 h after completion. Pour out above water, then add 1000 mL deionized water, stir and wash for 10 min, perform solid-liquid separation by a suction filtration method, continue washing a solid filter cake for 3 times with deionized water, dry the solid filter cake in an oven at 43° C. for 9 h after separating the adsorbent, heat up to 120° C. and dry for 12 h to obtain a titanium hexametaphosphate adsorbent.

Embodiment 6: Preparation of an Adsorbent

Weigh 0.2 mol $(NaPO_3)_6$ and dissolve in 200 mL water to prepare a solution; add concentrated nitric acid to adjust the pH of the solution to 4; rapidly stir the solution at a room temperature and add 0.4 mol $Ti(SO_4)_2$. Then pour a mixture into a reactor and continue a hydrothermal reaction in an oven at 100° C. for 6 h. Take out and stand still at a room temperature to age for 12 h after completion. Pour out above water, then add 1000 mL deionized water, stir and wash for 10 min, perform solid-liquid separation by a suction filtration method, continue washing a solid filter cake for 3 times with deionized water, dry the solid filter cake in an oven at 55° C. for 8 h after separating the adsorbent, heat up to 100° C. dry for 8 h to obtain a titanium hexametaphosphate adsorbent-6.

Embodiment 7: Preparation of an Adsorbent

Weigh 0.2 mol $(NaPO_3)_6$ and dissolve in 200 mL water to prepare a solution; add concentrated sulfuric acid to adjust the pH of the solution to 2; rapidly stir the solution and add 0.4 mol titanium tetrachloride. Then pour a mixture into a reactor and continue a hydrothermal reaction in an oven at 100° C. for 6 h. Take out and stand still at a room temperature to age for 12 h after completion. Pour out above water, then add 1000 mL deionized water, stir and wash for 10 min, perform solid-liquid separation by a suction filtration method, continue washing a solid filter cake for 3 times with deionized water, dry the solid filter cake in an oven at 55° C. for 8 h after separating the adsorbent, heat up to 100° C. dry for 8 h to obtain a titanium hexametaphosphate adsorbent-7.

Embodiment 8: Preparation of an Adsorbent

Weigh 0.2 mol $(NaPO_3)_6$ and dissolve in 200 mL water to prepare a solution; add concentrated nitric acid to adjust the pH of the solution to 2; rapidly stir the solution at a room temperature and add 0.4 mol $Ti(SO_4)_2$. Then pour a mixture into a reactor and continue a hydrothermal reaction in an oven at 100° C. for 6 h. Take out and stand still at a room temperature to age for 12 h after completion. Pour out above water, then add 1000 mL deionized water, stir and wash for 10 min, perform solid-liquid separation by a suction filtration method, continue washing a solid filter cake for 3 times with deionized water, dry the solid filter cake in an oven at 85° C. for 16 h after separating the adsorbent to obtain a titanium hexametaphosphate adsorbent-8.

Embodiment 9: Preparation of an Adsorbent

Weigh 0.2 mol $(NaPO_3)_6$ and dissolve in 200 mL water to prepare a solution; add concentrated nitric acid to adjust the pH of the solution to 1; rapidly stir the solution at a room temperature and add 0.3 mol $Ti(SO_4)_2$. Then pour a mixture into a reactor and continue a hydrothermal reaction in an oven at 100° C. for 1 h. Take out and stand still at a room temperature to age for 24 h after completion. Pour out above water, then add 1000 mL deionized water, stir and wash for 10 min, perform solid-liquid separation by a suction filtration method, continue washing a solid filter cake for 4 times with deionized water, dry the solid filter cake in an oven at 50° C. for 2 h after separating the adsorbent, heat up to 100° C. dry for 12 h to obtain a titanium hexametaphosphate adsorbent-9.

Embodiment 10: Application of an Adsorbent in Wastewater Treatment

For certain thallium-containing wastewater, a concentration of univalent thallium is 2.029 mg/L and a pH of wastewater is 6.5. Take 1 L wastewater, add 0.5 g titanium hexametaphosphate adsorbent-2 prepared in Embodiment 2, perform solid-liquid separation after stirring and mixing for 1 h, and measure a concentration of thallium in the wastewater by an ICP-MS method, the concentration of thallium in wastewater measured being 3.35 μg/L(less than 5 μg/L).

Embodiment 11: Application of an Adsorbent in Wastewater Treatment

For certain thallium-containing wastewater, a concentration of univalent thallium is 2.349 mg/L and a pH of wastewater is 5.5. Take 1 L wastewater, add 0.45 g titanium hexametaphosphate adsorbent-1 prepared in Embodiment 1, perform solid-liquid separation after stirring and mixing for 2 h, and measure a concentration of thallium in the wastewater by an ICP-MS method, the concentration of thallium in wastewater measured being 3.85 μg/L(less than 5 μg/L).

Embodiment 12: Application of an Adsorbent in Wastewater Treatment

For certain thallium-containing wastewater, a concentration of univalent thallium is 2.524 mg/L and a pH of wastewater is 3.5. Take 1 L wastewater, add 0.5 g titanium hexametaphosphate adsorbent-3 prepared in Embodiment 3, perform solid-liquid separation after stirring and mixing for 1 h, and measure a concentration of thallium in the wastewater by an ICP-MS method, the concentration of thallium in wastewater measured being 4.05 μg/L(less than 5 μg/L).

Embodiment 13: Application of an Adsorbent in Wastewater Treatment

For certain thallium-containing wastewater, a concentration of univalent thallium is 2.721 mg/L and a pH of wastewater is 2.5. Take 1 L wastewater, add 0.6 g titanium hexametaphosphate adsorbent-4 prepared in Embodiment 4, perform solid-liquid separation after stirring and mixing for 1 h, and measure a concentration of thallium in the wastewater by an ICP-MS method, the concentration of thallium in wastewater measured being 3.95 μg/L(less than 5 μg/L).

Embodiment 14: Application of an Adsorbent in Wastewater Treatment

For certain thallium-containing wastewater, a concentration of univalent thallium is 2.876 mg/L and a pH of wastewater is 4.5. Take 1 L wastewater, add 0.5 g titanium hexametaphosphate adsorbent-5 prepared in Embodiment 5, perform solid-liquid separation after stirring and mixing for 1 h, and measure a concentration of thallium in the wastewater by an ICP-MS method, the concentration of thallium in wastewater measured being 4.15 μg/L(less than 5 μg/L).

Embodiment 15: Application of an Adsorbent in Wastewater Treatment

For certain thallium-containing wastewater, a concentration of univalent thallium is 2.029 mg/L and a pH of wastewater is 6.5. Take 1 L wastewater, add 0.5 g titanium hexametaphosphate adsorbent-6 prepared in Embodiment 6, perform solid-liquid separation after stirring and mixing for 1 h, and measure a concentration of thallium in the wastewater by an ICP-MS method, the concentration of thallium in wastewater measured being 4.85 μg/L(less than 5 μg/L).

Embodiment 16: Application of an Adsorbent in Wastewater Treatment

For certain thallium-containing wastewater, a concentration of univalent thallium is 2.029 mg/L and a pH of wastewater is 6.5. Take 1 L wastewater, add 0.5 g titanium hexametaphosphate adsorbent-7 prepared in Embodiment 7, perform solid-liquid separation after stirring and mixing for 1 h, and measure a concentration of thallium in the wastewater by an ICP-MS method, the concentration of thallium in wastewater measured being 3.45 μg/L(less than 5 μg/L).

Embodiment 17: Application of an Adsorbent in Wastewater Treatment

For certain thallium-containing wastewater, a concentration of univalent thallium is 2.029 mg/L and a pH of wastewater is 6.5. Take 1 L wastewater, add 0.5 g titanium hexametaphosphate adsorbent-8 prepared in Embodiment 8, perform solid-liquid separation after stirring and mixing for 1 h, and measure a concentration of thallium in the wastewater by an ICP-MS method, the concentration of thallium in wastewater measured being 4.95 μg/L(less than 5 μg/L).

Embodiment 18: Application of an Adsorbent in Wastewater Treatment

For certain thallium-containing wastewater, a concentration of univalent thallium is 2.349 mg/L and a pH of wastewater is 5.5. Take 1 L wastewater, add 0.45 g titanium hexametaphosphate adsorbent-9 prepared in Embodiment 9, perform solid-liquid separation after stirring and mixing for 2 h, and measure a concentration of thallium in the wastewater by an ICP-MS method, the concentration of thallium in wastewater measured being 3.55 μg/L(less than 5 μg/L).

Embodiment 19: Application of an Adsorbent in Wastewater Treatment

For certain thallium-containing wastewater, a concentration of univalent Thallium is 2.157 mg/L and a pH of wastewater is 3.5. Take 1 L wastewater, add 0.8 g titanium hexametaphosphate adsorbent-2 prepared in Embodiment 2, perform solid-liquid separation after stirring and mixing for 1 h, and measure a concentration of thallium in the wastewater by an ICP-MS method, the concentration of thallium in wastewater measured being 3.35 µg/L, less than 5 µg/L.

Embodiment 20: Application of an Adsorbent in Wastewater Treatment

For certain cadmiun-containing wastewater, a concentration of cadmiun is 15.159 mg/L and a pH of wastewater is 7.0. Take 1 L wastewater, add 0.8 g titanium hexametaphosphate adsorbent-5 prepared in Embodiment 5, perform solid-liquid separation after stirring and mixing for 1 h, and measure a concentration of cadmiun in the wastewater by an ICP-MS method, the concentration of cadmiun being 0.045 mg/L(less than 0.05 mg/L).

Embodiment 21: Application of an Adsorbent in Wastewater Treatment

For certain plumbum-containing wastewater, a concentration of plumbum is 4.065 mg/L and a pH of wastewater is 8.0. Take 1 L wastewater, add 1.0 g titanium hexametaphosphate adsorbent-4 prepared in Embodiment 4, perform solid-liquid separation after stirring and mixing for 1 h, and measure a concentration of plumbum in the wastewater by an ICP-MS method, the concentration of plumbum in wastewater measured being 4.5 µg/L(less than 5 µg/L).

Embodiment 22: Application of an Adsorbent in Wastewater Treatment

For certain copper-containing wastewater, a concentration of copper is 3.071 mg/L and a pH of wastewater is 6.5. Take 1 L wastewater, add 0.8 g titanium hexametaphosphate adsorbent-4 prepared in Embodiment 4, perform solid-liquid separation after stirring and mixing for 1 h, and measure a concentration of copper in the wastewater by an ICP-MS method, the concentration of copper in wastewater measured being 3.7 µg/L(less than 5 µg/L).

Embodiment 23: Application of an Adsorbent in Wastewater Treatment

For certain stibium-containing wastewater, a concentration of stibium is 3.446 mg/L and a pH of wastewater is 7.2. Take 1 L wastewater, add 0.8 g titanium hexametaphosphate adsorbent-2 prepared in Embodiment 2, perform solid-liquid separation after stirring and mixing for 1 h, and measure a concentration of stibium in the wastewater by an ICP-MS method, the concentration of stibium in wastewater measured being 5 µg/L(less than 6 µg/L).

Embodiment 24: Application of an Adsorbent in Wastewater Treatment

For certain uranium-containing wastewater, a concentration of uranium is 2.53 mg/L and a pH of wastewater is 7.5. Take 1 L wastewater, add 1.0 g titanium hexametaphosphate adsorbent-4 prepared in Embodiment 4, perform solid-liquid separation after stirring and mixing for 1 h, and measure a concentration of uranium in the wastewater by an ICP-MS method, the concentration of uranium in wastewater measured being 78 µg/L(less than 0.1 mg/L).

Embodiment 25: Application of an Adsorbent in Wastewater Treatment

For certain caesium-containing wastewater, a concentration of caesium is 3.653 mg/L and a pH of wastewater is 7.5. Take 1 L wastewater, add 1.0 g titanium hexametaphosphate adsorbent-4 prepared in Embodiment 4, perform solid-liquid separation after stirring and mixing for 1 h, and measure a concentration of caesium in the wastewater by an ICP-MS method, the concentration of caesium in wastewater measured being 88 µg/L.

Embodiment 26: Application of an Adsorbent in Wastewater Treatment

For certain acid mine wastewater, a concentration of thallium is 4.317 µg/L and a pH of wastewater is 2.7. Take 1 L wastewater, add 0.1 g titanium hexametaphosphate adsorbent-2 prepared in Embodiment 2, perform solid-liquid separation after stirring and mixing for 1 h, and measure a concentration of thallium in the wastewater by an ICP-MS method, the concentration of thallium in wastewater measured being 1.211 m/L.

Embodiment 27: Application of an Adsorbent in Wastewater Treatment

For certain acid mine wastewater, a concentration of stibium is 14.876 m/L and a pH of wastewater is 2.7. Take 1 L wastewater, add 0.1 g titanium hexametaphosphate adsorbent-2 prepared in Embodiment 2, perform solid-liquid separation after stirring and mixing for 1 h, and measure a concentration of stibium in the wastewater by an ICP-MS method, the concentration of stibium in wastewater measured being 2.345 µg/L.

Contrast Embodiment 1: A Titanium Dioxide Adsorbent in Wastewater Treatment

For certain thallium-containing wastewater, a concentration of univalent thallium is 2.157 mg/L and a pH of wastewater is 2.7. Take 1 L wastewater, add 0.8 g titanium dioxide adsorbent, perform solid-liquid separation after stirring and mixing for 1 h, and measure a concentration of thallium in the wastewater by an ICP-MS method, the concentration of thallium in wastewater measured being 0.205 mg/L.

Contrast Embodiment 2: A Manganese Dioxide Adsorbent in Wastewater Treatment

For certain thallium-containing wastewater, a concentration of univalent thallium is 5.029 mg/L and a pH of wastewater is 3.5. Take 1 L wastewater, add 0.5 g manganese dioxide adsorbent, perform solid-liquid separation after stirring and mixing for 1 h, and measure a concentration of thallium in the wastewater by an ICP-MS method, the concentration of thallium measured being 0.183 mg/L and the concentration of manganese being 1.211 mg/L (material dissolved).

Contrast Embodiment 3: A Hydrated Ferric Oxide Adsorbent in Wastewater Treatment For certain thallium-containing wastewater, a concentration of univalent thallium is 4.121 mg/L and a pH of wastewater is 3.0. Take 1 L wastewater, add 0.6 g hydrated ferric oxide adsorbent, perform solid-liquid separation after stirring and mixing for 1 h, and measure a concentration of thallium in the wastewater by an ICP-MS method, the concentration of thallium measured being 0.335 mg/L and the concentration of ferri being 2.19 mg/L (material dissolved).

Contrast Embodiment 4: An Aluminum Oxide Adsorbent in Wastewater Treatment

For certain thallium-containing wastewater, a concentration of univalent thallium is 6.923 mg/L and a pH of wastewater is 2.7. Take 1 L wastewater, add 0.8 g aluminum oxide adsorbent, perform solid-liquid separation after stirring and mixing for 1 h, and measure a concentration of thallium in the wastewater by an ICP-MS method, the concentration of thallium measured being 0.818 mg/L and the concentration of aluminum being 0.819 mg/L (material dissolved).

What is claimed:

1. A method for producing an absorbent, comprising:
adding acid into a hexametaphosphate solution for adjusting a pH to prepare a mixed solution, wherein the hexametaphosphate is selected from a group consisting of sodium hexametaphosphate, potassium hexametaphosphate, and ammonium hexametaphosphate,
adding titanium salt into the mixed solution,
reacting, aging and filtering to obtain a filter residue as the absorbent.

2. The method of claim 1, wherein, the pH is 0-6; preferably, the pH is 0-3.

3. The method of claim 1, wherein a ratio of amount of substance of the hexametaphosphate to the titanium salt is (1-2):(3-1).

4. The method of claim 1, wherein, the titanium salt is selected from at least one of titanium tetrachloride, titanium oxychloride, titanium nitrate or titanium sulfate.

5. The method of claim 1, further comprising purifying of a filter residue; wherein the purifying includes water washing and drying.

* * * * *